United States Patent [19]
Hebiguchi

[11] Patent Number: 5,497,146
[45] Date of Patent: Mar. 5, 1996

[54] MATRIX WIRING SUBSTRATES

[75] Inventor: Hiroyuki Hebiguchi, Sendai, Japan

[73] Assignee: Frontec, Incorporated, Sendai, Japan

[21] Appl. No.: 68,461

[22] Filed: May 27, 1993

[30] Foreign Application Priority Data

| Jun. 3, 1992 | [JP] | Japan | 4-143009 |
| Jul. 10, 1992 | [JP] | Japan | 4-184208 |
| Feb. 18, 1993 | [JP] | Japan | 5-29462 |

[51] Int. Cl.$^6$ .................................. H04Q 1/18
[52] U.S. Cl. ........................ 340/825.91; 340/825.79; 345/92; 345/904; 359/54; 359/59; 257/452
[58] Field of Search .................. 340/825.91, 825.79; 345/90, 91, 92, 93, 206, 904; 359/54, 58, 59, 60; 445/24; 257/59, 328, 355, 356, 360, 363, 409, 452, 484

[56] References Cited

U.S. PATENT DOCUMENTS

| 4,457,588 | 7/1984 | Yasukawa . | |
| 4,940,934 | 7/1990 | Kawaguchi et al. | 345/904 |
| 5,019,002 | 5/1991 | Holmberg | 445/24 |
| 5,068,748 | 11/1991 | Ukai et al. | 359/59 |
| 5,168,382 | 12/1992 | Tsujikawa | 359/58 |
| 5,184,235 | 2/1993 | Sukegawa | 359/60 |
| 5,212,573 | 5/1993 | Yamazaki | 359/54 |
| 5,220,443 | 6/1993 | Noguchi | 359/59 |
| 5,233,448 | 8/1993 | Wu | 359/59 |

FOREIGN PATENT DOCUMENTS

| 0369828 | 5/1990 | European Pat. Off. | 345/904 |
| 56-212961 | 12/1981 | Japan . | |
| 8805170 | 7/1988 | WIPO | 345/93 |

Primary Examiner—Donald J. Yusko
Assistant Examiner—Edwin C. Holloway, III
Attorney, Agent, or Firm—Guy W. Shoup; Patrick T. Bever

[57] ABSTRACT

A matrix wiring substrate is provided which can perform an electrostatic countermeasure until drive circuits are connected to a matrix wiring substrate, whereby the circuit wiring can be inspected at an earlier stage. The matrix wiring substrate, where circuit wiring is formed over a substrate, includes a guard ring formed around the circuit wiring and connected to the circuit wiring, and separable portions arranged between the circuit wiring and the guard ring for controlling the conduction between the circuit wiring and the guard ring. Since the circuit wiring is conducted with the guard ring by effecting externally the separable portion, lines of the circuit wiring are short-circuited electrically. No potential difference between the wires causes any electric discharge, thus resulting in increased manufacturing yield.

9 Claims, 10 Drawing Sheets

MATRIX WIRING SUBSTRATES

BACKGROUND OF THE INVENTION

1. Field of the Invention

The present invention relates to a matrix wiring substrate where a circuit wiring is arranged in a matrix form, and more particularly to a matrix wiring substrate to which electrostatic countermeasure can be established during its manufacture.

2. Description of the Related Art

Recently, the development of flat displays as visual units is particularly drawing the attention. Of such displays, since liquid crystal display devices have many advantages, it has been desired to spur the further development thereof to a leading display system for the future.

Liquid crystal displays employing an active matrix system which include amorphous-silicon thin film transistors (a—Si TFTs) are predicted to take a leading position because of their good display quality. At present, the development thereof is directing toward practical displays from relatively small ones.

The active matrix type liquid crystal display is manufactured by the steps of making a matrix wiring substrate on which pixels electrodes, gate lines and source lines arranged on the pixel electrodes, and thin film transistors (TFTs) are formed in a matrix form over a glass substrate such as an insulator; subjecting the substrate to an assembling step; injecting a liquid crystal material; and connecting drive circuits.

In the steps, static electricity tends to produce between electrodes during the manufacture of the matrix wiring substrate. Since the electrostatic discharge destroys the insulator or semiconductor material for TFT transistor, and the heat generated from the electrostatic discharge damages the circuit wiring, the manufacturing yield of the wiring substrate is largely degraded. Particularly, a—Si TFTs are breakable with respect to static electricity.

Conventionally, as shown in FIG. 10, the guard ring 12 disclosed in Japanese Laid-open Patent Publication No. 58-116573 has been formed in order to prevent the electrostatic damage. After the manufacture of the matrix wiring substrate 10, the outer peripheral portion of the pixel area 14 is cut away together with the glass substrate 24 using a cutting tool such as a diamond cutter. After the guard ring 12 is cut away, the resultant wiring substrate is subjected to post steps including an assembling step and a drive circuit connecting step.

FIGS. 11 and 12 show a structural example where a portion including a gate line 16 and a source line 18 are actually formed on a substrate in a conventional active matrix liquid crystal display device shown in FIG. 10.

The electrostatic countermeasure according to the above mentioned method is effective when the guard ring 12 is formed. However, after the guard ring is cut off in the post steps, since the wiring substrate is exposed to the static electricity, it is susceptible to the static electricity at the post steps (by the time when drive circuit is assembled). Therefore, the possibility that the wiring substrate is damaged remains higher.

Particularly, since the static electricity tends to generate during the LCD assembling process, together with the a—Si TFT transistor forming step, it has been a serious problem that any electrostatic countermeasure is not taken during the assembling step.

In the above mentioned electrostatic countermeasure, although source lines and gate lines are in the same potential, it is uncertain whether the switching element 20 is switched on.

Therefore, when the pixel electrodes 22 is electrostatically charged, a voltage creates between the gate line and the pixel electrode, thus causing a degradation factor of TFT transistors.

Furthermore, when the guard ring 12 is cut away, a static electricity is liable to generate between the glass substrate 24 and a cutting tool, thus causing a damage of the circuit substrate.

While the guard ring 12 is being formed, the circuit wiring cannot be inspected because the source line 18 is short-circuited electrically with the gate line 16. The guard ring 12 has been once cut away on purpose of an inspection, the guard ring 12 cannot be rebuilt so that the circuit wiring becomes open to the static electricity after the inspection. Hence since the possibility that defects occur after the inspection is high, the inspection becomes substantially meaningless. To overcome such a problem, the inspection has been performed after separating off the guard ring 12 and then connecting a drive circuit by way of the post steps including a wiring substrate assembling step. However, according to the above mentioned method, even if a defect in the circuit wiring is found, it is too late to treat it because many steps have been passed. Thus many rejected articles are subjected to disposal treatment, thus leading to large manufacturing loss. Therefore, it has been desirable to inspect the circuit wiring at early stage.

SUMMARY OF THE INVENTION

The present invention is made to overcome the above problems in the prior arts. An object of the present invention to provide a matrix wiring substrate where a countermeasure against static electricity can be taken until drive circuits are connected to a matrix wiring substrate and the circuit wiring inspection can be carried out at an earlier stage.

Another object of the present invention is to provide a method for manufacturing matrix wiring substrates.

The matrix wiring substrate according to the present invention is characterized by a substrate; a circuit wiring formed in a matrix form on the substrate; a guard ring formed around the circuit wiring and connected to the circuit wiring; and a separable portion arranged between the circuit wiring and the guard ring for controlling the conduction between the circuit wiring and the guard ring.

The matrix wiring substrate is characterized in that the separable portion is formed of a switching element for selectively switching to a conduction or isolation between the circuit wiring and the guard ring; and an electric power supply portion for controlling the switching element.

The matrix wiring substrate is characterized in that the separable portion is constituted of a variable resistance element or a variable resistance circuit.

The matrix wiring substrate according to the present invention is characterized by a substrate; a circuit wiring formed on the substrate and being formed of source lines and gate lines arranged in a matrix form, and switching elements Which are respectively formed at intersections between the source lines and the gate lines; a guard ring arranged around the circuit wiring and connected to the circuit wiring; and an electric power supply controller for supplying a voltage to the circuit wiring.

Regarding various transistors according to the present invention, a switching element being in a conductive state corresponds to a switching on state while a switching element being in an isolation state corresponds to a switching off state.

In the matrix wiring substrate according to the present invention, a guard ring is formed around the outer peripheral portion of a circuit wiring, and a separable portion is formed to control the conduction between the circuit wiring and the guard ring.

The guard ring for conducting the circuit wiring does not create any potential difference because lines are electrically short-circuited to one another by the guard ring even if static electricity is generated in the circuit wiring, whereby electric discharge does not generate due to static electricity.

Furthermore, since the separable portion is formed between the circuit wiring and the guard ring to switch easily to the conduction or isolation, isolating the circuit wiring from the guard ring by the separable portion can provide the same effect as that of the circuit wiring where a guard ring has been removed. In addition, the conduction between the circuit wiring and the guard ring can be regained even after the isolating operation, it is unnecessary to cut completely away the guard ring.

Therefore, the circuit wiring inspection as well as drive circuit connection can be carried out without removing completely the guard ring. It is possible to repeat the inspection arbitrarily and at desired times even if the circuit wiring has a structure where an inspection must be performed after the guard ring has been removed from the circuit substrate. That is, this means that an inspection can be achieved in the state that the separable portion isolates the guard ring from the circuit wiring, and the conduction between the guard ring the circuit wiring can be restored after the inspection.

Therefore, even after an inspection, an electrostatic countermeasure can be performed, if necessary, by conducting the guard ring with the circuit wiring at all times The separable portion according to the present invention is controlled by an external effect thereto and can be easily switched accurately to the conduction or isolating of the guard ring. Moreover, for the separable portion, a switching element which is controllable in accordance with an external factor, or a variable resistance element or variable resistance circuit which is effected by an external factor.

In the transparent type liquid crystal display device where a light from the background is used inevitably, the backlight in the liquid crystal display device can be utilized as an external factor.

Furthermore, in the liquid crystal display device which includes a guard ring formed on the outer peripheral portion of the circuit wiring and an electric power supply controller for feeding an electromotive force to the guard ring, the on resistance of the switching element formed in the circuit wiring is made small because the electric power supply controller can positively supply a proper voltage to the circuit wiring, whereby the switching element can be certainly turned on. Therefore, it is possible to prevent certainly that the pixel electrode is electrostatically charged, thus preventing the switching element from retrograding.

BRIEF DESCRIPTION OF THE DRAWINGS

The present invention will hereinafter be explained in more detail with reference to the attached drawings in which.

DESCRIPTION OF THE PREFERRED EMBODIMENTS

A preferred embodiment of the matrix wiring substrate according to the present invention will be explained below in accordance with attached drawings. It should note that the present invention is not restricted within the embodiments.

(Embodiment 1)

The matrix wiring substrate according to the first embodiment will be explained with reference to FIG. 1.

Figure 1:
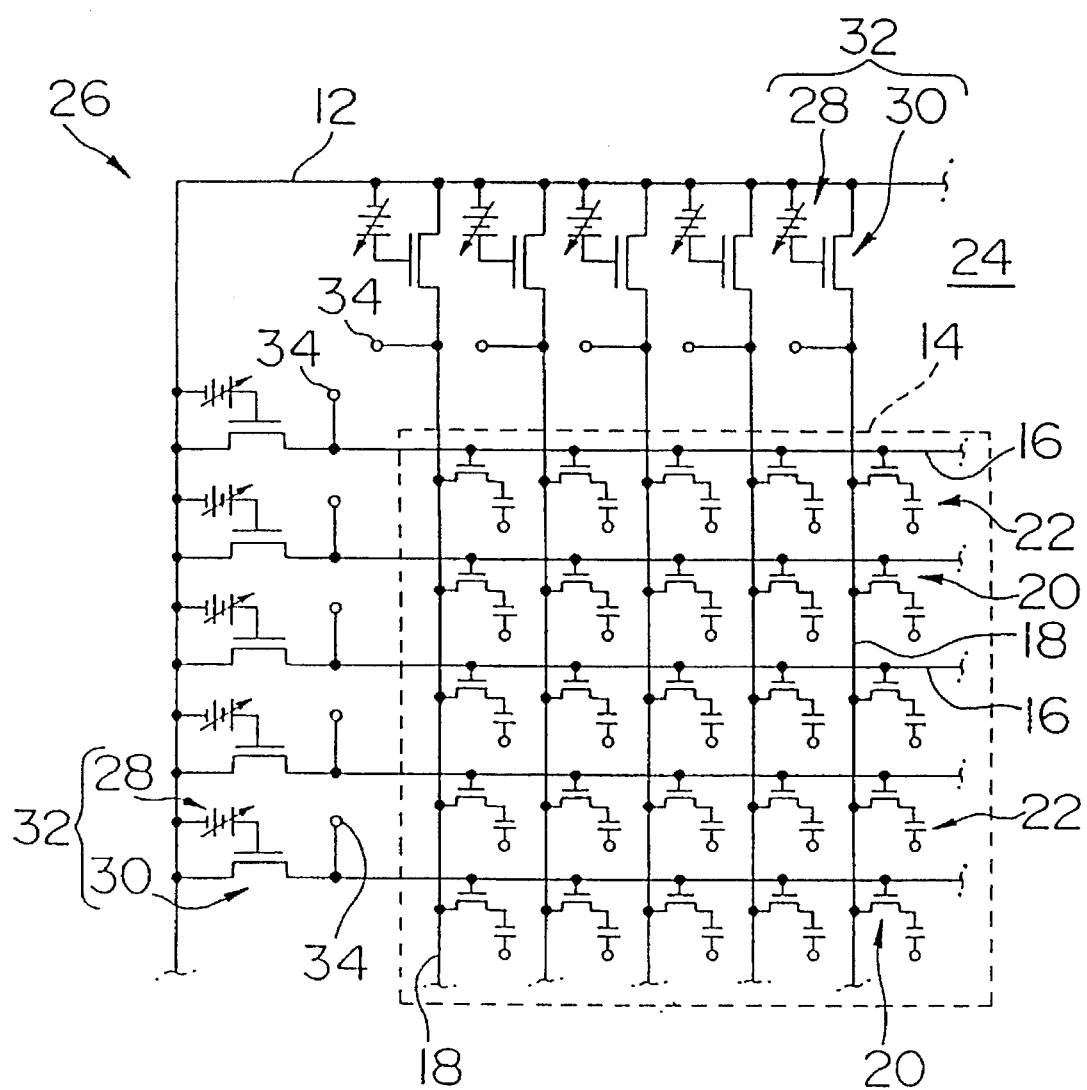
FIG. 1 is a circuit diagram illustrating a first embodiment of the matrix wiring substrate according to the present invention.

In the circuit wiring substrate 26 shown in FIG. 1, the circuit wiring within the pixel area 14 is well-known and used for an active matrix-type liquid crystal panel. A large number of source lines 18, 18 for flowing data signals and a large number of gate lines 16, 16 for flowing scanning signals are formed on a glass substrate in a matrix form. Pixel electrodes 22, 22 are formed between the gate lines 16 and the source lines 18. The pixel electrodes 22 are connected to the gate lines 16 and the source lines 18 by way of the switching elements (TFT transistors) 22, 22, respectively.

In the wiring substrate for the active matrix-type liquid crystal display, it has been known that the wiring, the pixel electrode, and the switching element can have various structures, respectively. Any kinds of structures using a matrix wiring substrate are applicable to the present invention. According to the present invention, it is no matter that the active matrix-type liquid crystal display structure in the pixel area 14 has an arbitrary shape.

The matrix wiring substrate 26 according to the present invention includes a guard ring 12 formed in the peripheral portion of the pixel area 14. The guard ring 12 is made of a conductive material and connected to the circuit wiring in the pixel area 14, that is, to the gate lines 16 and the source lines 18.

Moreover, in the matrix wiring substrate 26 according to the present invention, separable portions 32, 32 are formed to connect the circuit wiring in the pixel area 14 with the guard ring 12. The separable portion is formed of a switching element 30 and an electric power supply portion 28.

Any elements which can switch to the conduction isolation between the circuit wiring and the guard ring 12 can be used as the switching element 30. In the matrix wiring substrate 26 shown in FIG. 1, the switching element 30 is made of a TFT transistor.

The power supply portion 28 controls the conduction and isolation of the switching element 30. A solar cell is applied as the power supply portion 28 in the matrix wiring substrate 26 shown in FIG. 1.

The solar cell acting as the power supply portion 28 produces an electromotive force when it receives light so that the switching element 30 is turned on, thus making an electrical conduction between the circuit wiring and the guard ring 12.

The solar cell applied to the power supply portion 28 is made of an a—Si material similar to that of TFT transistors. The solar cell is made of a contact forming a homo-junction ($n^+$—a—Si/i—a—Si, $n^+$—a—Si/i—a—Si/$P^+$—a—Si, or the like), a hetero-junction, or a Schottky barrier. If necessary, a sufficient electromotive force can be created by connecting serially solar cells.

The power supply portion 28 may be means for controlling the switching element 30. For example, in addition of the solar cell, the power supply portion 28 may be substituted for any means for controlling the switching element 30 by using an externally produced electromotive force, including means for controlling the switching element 30 by using electromotive force due to electromagnetic induction produced by a coil, means for controlling the switching element 30 by using electromotive force produced due to a Hall effect, and means for controlling the switching element 30 by using thermo-electromotive force.

The power supply portion 28 also may be an element or circuit which can arbitrarily set to a desired value a voltage (for example, $Von \geq 2V$, $Voff \leq 1V$) which is necessary to switch the switching state (on or off state) of the switching element 30 and maintain it for several tens of minutes through several hours. A latch circuit used for a static RAM or the like, for example, may be used as the power supply portion 28.

Furthermore, a capacitor with a large capacitance value and small current leakage may be applicable as the power supply portion 28. In this case, the capacitor is charged to isolate the circuit wiring from the guard ring 12. When the circuit wiring is conducted with the guard ring 12, the capacitor is charged to turn on the switching element 30.

The apparent capacitance value of the capacitor can be made to be large by combining it with an amplifier to utilize a Miller effect. In this case, the capacitance value is increased to the value multiplied by the amplitude of an amplifier.

The circuit wiring and the guard ring 12 on the matrix wiring substrate 26 are produced by the steps of forming a conductive material such as Ta, Mo, Al, Cu, or similar materials by using a sputtering method or an electron beam evaporation method on the glass substrate 24, and then patterning it in a desired shape by using photolithographic process.

In the matrix wiring substrate 26 according to the present invention, the switching element 30 can be remain in switching-on state to conduct the circuit wiring with the guard ring 12 during the manufacturing process (or until the circuit wiring is connected with drive circuits), by supplying an electromotive force from the power supply portion 28 produced externally or by supplying an electromotive force from a solar cell produced through light irradiation thereonto if the solar cell is applied.

Since the conduction between the circuit wiring and the guard ring 12 makes a short-circuit between the source line 18 and the gate line 16, no potential difference therebetween occurs, whereby the source line and the gate line are at the same potential to each other. Therefore, no electric discharge causes any breakage of the insulator and semiconductor of TFT transistors for pixels and any damage of the circuit wiring due to heat produced from the electric discharge, thus increasing largely the manufacturing yield of the wiring substrate.

When no electrostatic countermeasure is needed because drive circuits (not shown) has been connected to the drive circuit connecting terminals 34, 34, the circuit wiring and the guard ring 12 can be isolated from each other by turning off the switching elements 30. The switching-off state can be established by setting the electromotive force to less than the threshold voltage of the TFT switching element 30 while the power supply portion (solar cell) 28 is destroyed or blinded optically so as to produce no electromotive force (the solar cell may be covered or taped with something). Isolating the circuit wiring from the guard ring 12 results in that the circuit wiring can be driven only by the drive circuit.

Therefore, the matrix wiring substrate according to the present invention does not require to cut away the circuit wiring from the guard ring 12. The guard ring can be left connected during a manufacture of the circuit wiring until the drive circuits will be connected thereto so that the electrostatic countermeasure can be maintained and assured until the drive circuits wanting an electrostatic protection will be connected.

Furthermore, since the guard ring 12 is not cut away, the matrix wiring substrate of the present invention is not involved in the damage due to static electricity which has occurred very often between the substrate and a cutting tool during a conventional cutting process, thus increasing largely the manufacturing yield, in comparison with the conventional one.

Since the conduction and isolation between the circuit wiring and the guard ring 12 can be established arbitrarily and repeatedly until the power supply portion 28 is destroyed, the circuit wiring can be reconducted with the guard ring 12 after the circuit wiring has been isolated once from the guard ring 12 to inspect the circuit wiring. Therefore the circuit wiring can be inspected at any time and at early stage. To discover the defect of the circuit wiring at an early stage enables to decreases largely the manufacturing loss.

In the present invention, an active matrix-type liquid crystal display using TFT transistors has been illustrated. However, it should be noted that the present invention is not limited to the present embodiments. For example, the matrix wiring substrate according to the present invention can be naturally applied for active matrix-type liquid crystal displays using MIMs, a simple matrix-type liquid crystal displays, various flat displays (such as ELs), and various sensor arrays (such as image sensor arrays, pressure sensor arrays).

(Embodiment 2)

Figure 2:
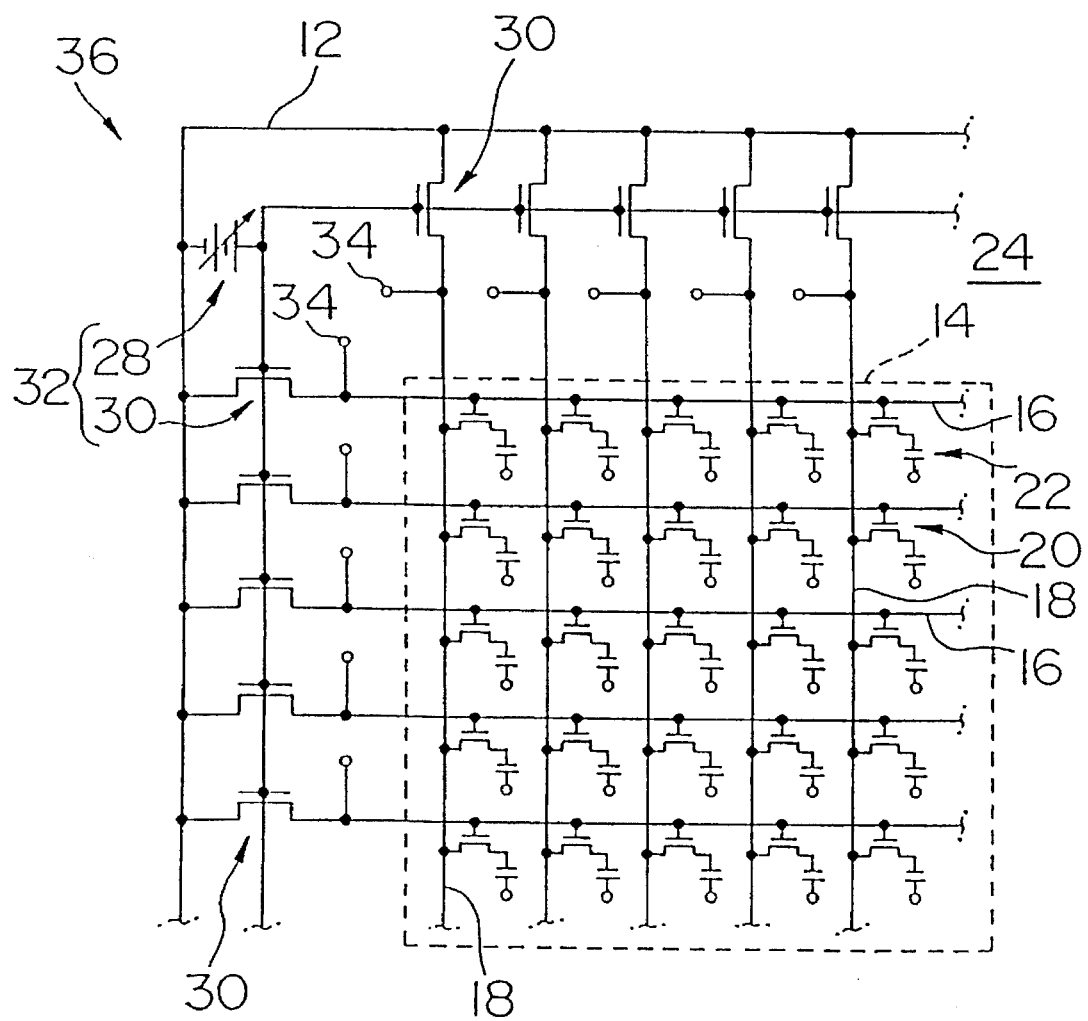
FIG. 2 is a circuit diagram illustrating a second embodiment of the matrix wiring substrate according to the present invention.

The matrix wiring substrate according to the second embodiment will be explained below referring to FIG. 2. The matrix wiring substrate 36 shown in FIG. 2 is different from the matrix wiring substrate 26 of the first embodiment in that the gate electrodes of the switching elements 30, 30 being formed of a plurality of TFT transistors are connected in common while the power supply portion 28 is arranged between the gate electrodes and the guard ring 12. Namely, in the matrix wiring substrate according to the second embodiment, the separable portion 32 is constituted of a large number of switching elements 30, 30 and a single power supply portion 28.

According to the matrix wiring substrate of the second embodiment, an illuminating or shielding can be performed to only one spot in order to illuminate light to the solar cell being the power supply portion 29 or to shield it from the solar cell. Hence the power supply portion 28 can be controlled easily and certainly.

The other functions, structure, and effects of the present embodiment are substantially similar to those of the matrix wiring substrate 26 shown in the first embodiment. According to the present invention, the single power supply portion 28 drives all the switching elements 30, 30. However, different power supply portions may be connected to the switching elements 30 connected to respective power source lines 18 where all the gate electrodes are connected in common and the switching elements 30 connected to respective gate lines 16 where all the gate electrodes are connected in common.

(Embodiment 3)

Figure 3:
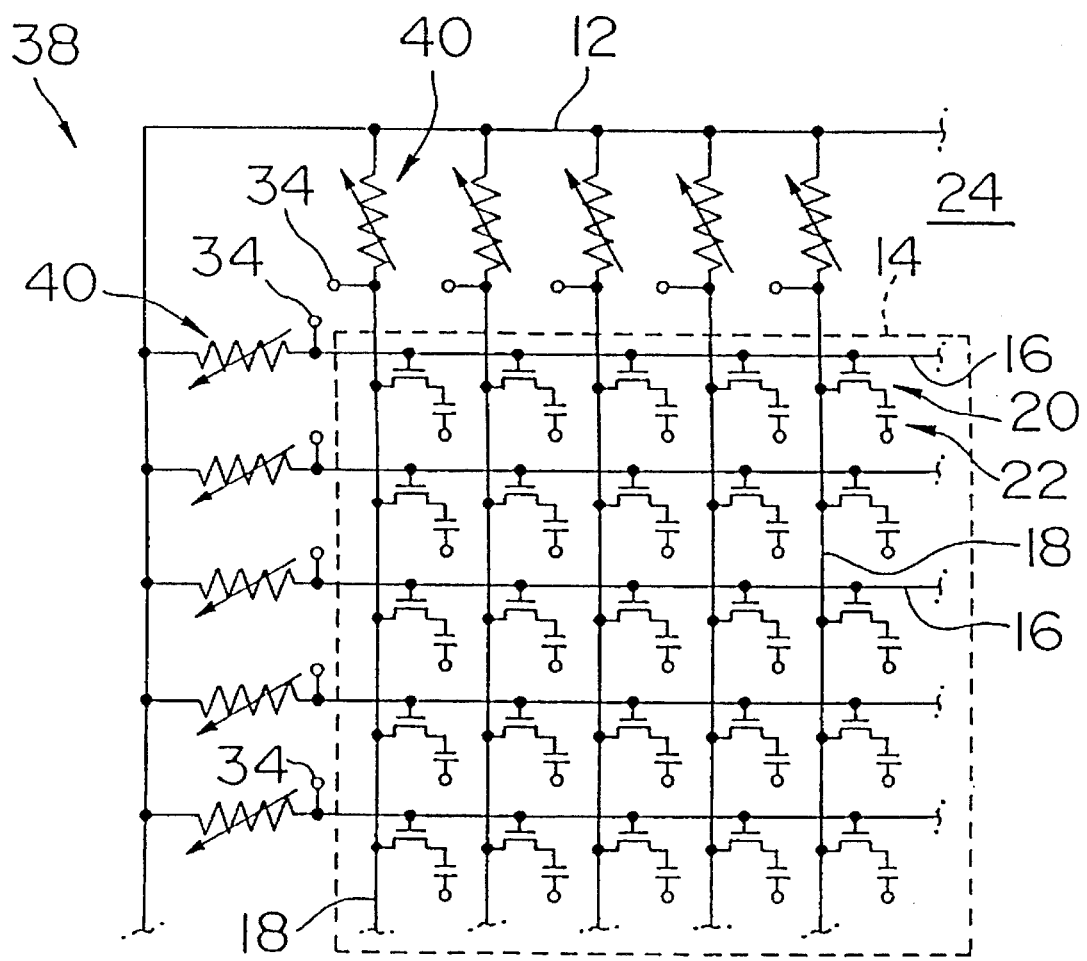
FIG. 3 is a circuit diagram illustrating a third embodiment of the matrix wiring substrate according to the present invention.

The matrix wiring substrate according to the third embodiment will be explained below referring to FIG. 3. The matrix wiring substrate 38 shown in FIG. 3 is different from the matrix wiring substrate 26 of the first embodiment in that variable resistance elements 40, 40 are applied as the separable portion. Elements of which the resistance value can be externally varied may be used as the variable resistance element 40. For example, a photoconductive element which changes its resistance value in response to light, a thermistor which changes its resistance value in response to temperature, a piezoresistance element or strain gauge which changes its resistance value in response to pressure, and a Hall element which changes its resistance in response to magnetic field may be applicable to the variable resistance element.

For a general display, there is no problems if the variable resistance element 40 varies up to the upper limit (higher resistance side) of $Rv \geq 10^5 \Omega$. The capability of the drive circuit at an assembling step may allow a resistance value smaller than the above resistance value to provide good display. It is good that the lower limit (lower resistance side) holds $Rv \leq 10^3 \Omega$. Selecting values as low as possible is desirable to obtain a large discharging rate.

In the matrix wiring substrate 38, it is better that the variable resistance element 40 has a small resistance value in order to conduct the circuit wiring with the guard ring 12.

After no electrostatic countermeasure is needed because drive circuit (not shown) have been connected to the drive circuit connecting terminals 34, 34, the circuit wiring is isolated from the guard ring 12 by shielding optically the photoconductive element 40 (by covering the photoconductive element with something or adhering a tape on the photoconductive element) or by increasing the resistance value.

(Embodiment 4)

Figure 4:
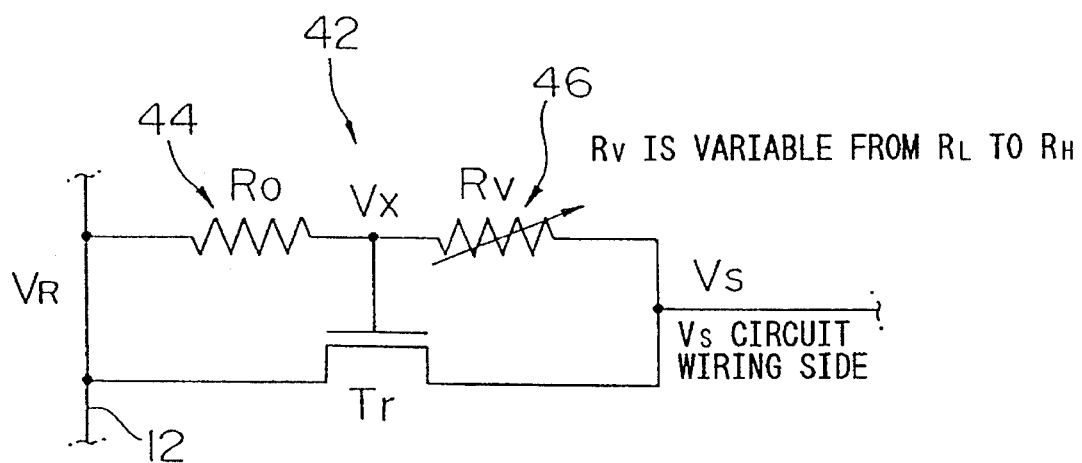
FIG. 4 is a circuit diagram illustrating a separable portion of a fourth embodiment of matrix wiring substrate according to the present invention.

According to the matrix wiring substrate of the fourth embodiment, the variable resistance element 42 shown in FIG. 4 is applied instead of the variable resistance element 40 shown in FIG. 3. Hence the whole general diagram of the matrix wiring substrate will be omitted by merely referring to FIG. 3.

In FIG. 4, Ro is a fixed resistance value of the resistor 44; Rv is the resistance value of the variable resistance element 46 which varies externally from Rl to Rh (Ro≈Rl, R <<Rh) (Various variable resistance elements applicable to the third embodiment can be used as the variable resistance element 46); Tr is a transistor (in this case, Ron<<Ro, Roff≧Rh>>Ro, where Ron is a switching-on resistance value of the transistor, and Roff is a switching-off resistance value of the transistor); Vr is a potential of the guard ring; Vx is a potential at the connecting point of resistors Ro and Rv and a gate potential of the transistor; and Vs is a potential of the circuit wiring.

In the matrix wiring substrate of the fourth embodiment, in order to carry out an electrostatic countermeasure or to conduct the circuit wiring with the guard ring 12, the difference between Vs and Vr is set small by decreasing the entire resistance of the variable resistance circuit 42.

In this case, if the resistance value Rv of the variable resistance element 46 sets externally to the condition of Rv=Rl≈Ro, the following expression holds:

$$Vx \approx (Vr+Vs)/2$$

When Vs is negatively charged with respect to Vr due to a static electricity, provided that Tr is an N-channel field effect transistor (FET), Vs is a source potential. Therefore, the gate-source voltage Vgs of the transistor Tr is expressed as follows:

$$Vgs = Vx - Vs \approx (Vr - Vs)/2$$

With respect to the threshold voltage Vth (several volts) of the transistor Tr, when Vgs≈(Vr−Vs)/2≧Vth, the transistor Tr is turned on. Therefore, the resistance R between the guard ring 12 and the circuit wiring is expressed as follows:

$$\begin{aligned} R &\approx (2Ro \times Ron)/(2Ro + Ron) \\ &\approx (2Ro \times Ron)/2Ro \; (\because Ron \ll Ro) \\ &\approx Ron \end{aligned}$$

Therefore, the entire resistance value R of the variable resistance circuit 42 is largely reduced, so that the discharging rate is increased very largely.

In the similar manner, when the transistor is an N-channel FET and Vs is positively charged with respect to Vr, Vr is a source potential. Therefore, Vgs of the transistor Tr is expressed as follows:

$$\begin{aligned} Vgs &= Vx - Vr \\ &\approx (Vs - Vr)/2 \end{aligned}$$

When Vgs≈(Vs−Vr)/2≧Vth with respect to Vth, the transistor Tr is turned on so that R≧Ron. Hence the entire resistance value of the variable resistance circuit 42 is largely reduced so that a large discharging rate can be achieved.

If the transistor Tr is a P-channel transistor, the same effect can be realized by reversing the polarity of the source potential Vs at the time of charging, with respect to Vr, comparing the use of the N-channel transistor.

In order to isolate the circuit wiring from the guard ring 12 during an inspection or driving operation of the circuit wiring, the equivalent resistance value R of the variable resistance circuit 42 is increased. In this case, the variable resistance value 46 is set so as to be Rv=Rh>> Ro, whereby Vx≈Vr since Rv>>Ro.

The potential range, which is applied to the circuit wiring in order to inspect or drive the circuit wiring, is expressed as VsL≦Vs≦VsH, the transistor Tr can maintain certainly its switching-off state by setting Vr with respect to Vs as follows:

(a) Vr<VsL when the transistor Tr is an N-channel FET.

(b) Vr>VsH when the transistor Tr is a P-channel FET.

When the transistor Tr is turned off, the resistance value between the circuit wiring and the guard ring 12 expressed as follows:

$$R=RH+Ro≈RH$$

Although depending on the capability of the drive circuit, the resistance value R is generally selected to be over $10^5$ Ω.

(Embodiment 5)

The fundamental circuit configuration of the matrix wiring substrate according to the fifth embodiment will be explained below referring to FIG. 5.

Figure 5:
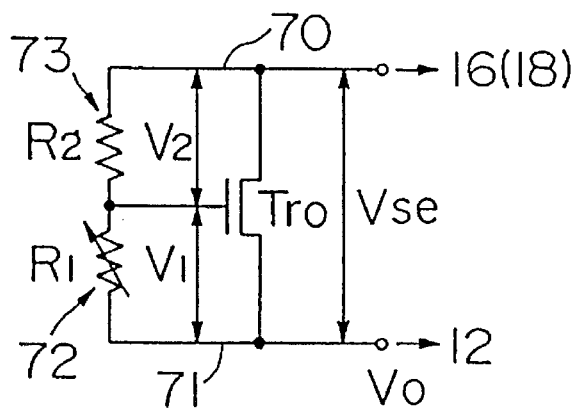
FIG. 5 is a fundamental circuit diagram illustrating a separable portion on the matrix wiring substrate according to the present invention.

FIG. 5 shows a fundamental configuration of the variable resistance circuit of the present embodiment. The circuit of the present embodiment is formed of a connecting wire 71 (shown in the previous embodiment) connected to the guard ring 12; a main transistor Tro connected between the gate line 16 and the source line 18 (shown in the previous embodiment), a variable resistance element (with a resistance value Rl) 72 which reduces its resistance value when a light hits onto the main transistor Tro; and a resistor (with a resistance value R2) 73.

In the circuit, V1 is the voltage across the variable resistance element 72; V2 is the voltage across the resistor 73; and Vse is the voltage which is supplied to the main transistor Tro via connecting wires 70 and 71 due to an occurrence of static electricity. The relation of Vl≈Vse/2 can be set by conditioning to the relation of R1≈R2 during a manufacture of the wiring substrate. Since Vl≧Vt when the Vse≧2Vt (where Vt is a threshold voltage of the main transistor Tro), the main transistor Tro is turned on, thus electrically discharging. This configuration can prevent the circuit wiring from static electricity because it operates always in spite of the polarity of the Vse.

Next, in the backlight-type liquid crystal display device applying the above circuit, when the device activates liquid crystal, since the variable resistance element 72 thereof is exposed to the backlight, the resistance value decreases so that the relation of R2>>R1 is obtained, whereby the relation of Vse≈V2>>V1≈0 holds. Therefore, when the potential Vo of the guard ring 12 is set to the negative largest value in the circuit, the main transistor Tro (an N-channel TFT) remains off. As a result, the power consumption can be suppressed to low value, without affecting the display of the liquid crystal device.

The variable resistance element 72 and the resistor 73 which have a higher resistance value, respectively, is desirable to display a liquid crystal display device. In order to manufacture the variable resistance element 72 and the resistor 73 using the thin film transistor manufacturing material for a liquid crystal display device, it is practical and preferable to utilize the off resistance of a thin film transistor.

Figure 6:
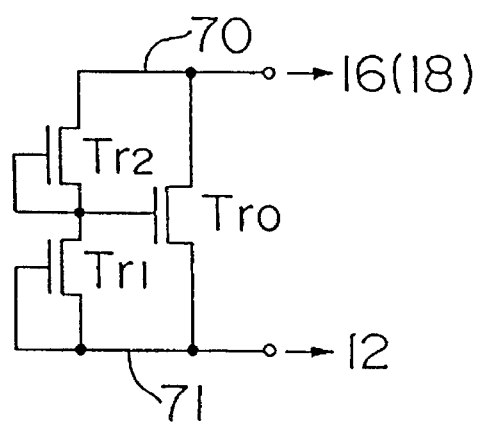
FIG. 6 is a circuit diagram illustrating a concrete circuit corresponding to the fundamental circuit diagram shown in FIG. 5.

In the above consideration, the structure shown in FIG. 6 can be employed as a preferable embodiment of the liquid crystal display device.

Figure 7:
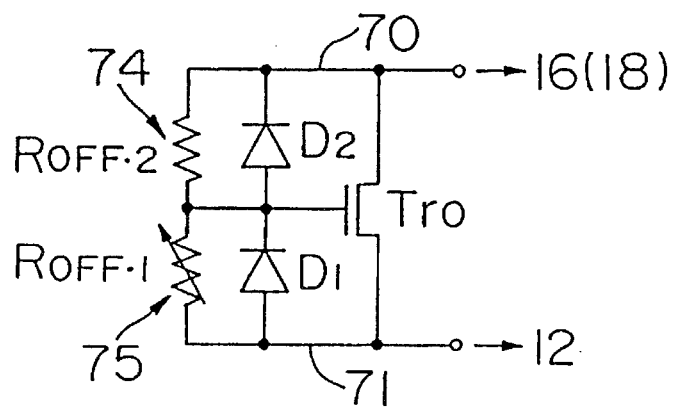
FIG. 7 is an equivalent circuit diagram of the circuit shown in FIG. 6.

In the configuration shown in FIG. 6, the main transistor Tro is connected in common to the first transistor Tr1 and the second transistor Tr2. FIG. 7 shows the equivalent circuit of the circuit shown in FIG. 6. In the equivalent circuit shown in FIG. 7, the main transistor Tro is connected to a resistor 74 corresponding to the off-resistance Roff2 of the second transistor Tr2, a diode D2, a variable resistance element 75 corresponding to the off resistance Roff1 of the first transistor Tr1, and a diode D1.

In the equivalent circuit, when the guard ring 12 is set to the deepest negative voltage, the diodes D1 and D2 are reversely biased, whereby a current flows through the resistor 74 and the variable resistance element 75. As a result, the gate voltage is determined by the resistance ratio of Roff2/Roff1. When the backlight causes $R_{off2}/R_{off1}$, the voltage between the gate and the source of the main transistor Tr0 becomes Vgs≈0, thus sustaining the main transistor Tro in off state.

As described above, when the liquid crystal display device is activated, it is required that the first transistor Tr1 and the second transistors Tr2 shown in FIG. 6 satisfy the relation of $R_{off2}>>R_{off1}$ (where $R_{off2}$ is an off resistance of the first transistor Tr1 and $R_{off1}$ is an off resistance of the first transistor.). In order to produce optically such a condition in concrete, the transparent type liquid crystal display device can utilize the backlight mentioned above. An embodiment is shown in FIGS. 8 and 9 where the first transistor Tr1 and the second transistor Tr2, in concrete, are built in the transparent type liquid crystal device.

Figure 8:
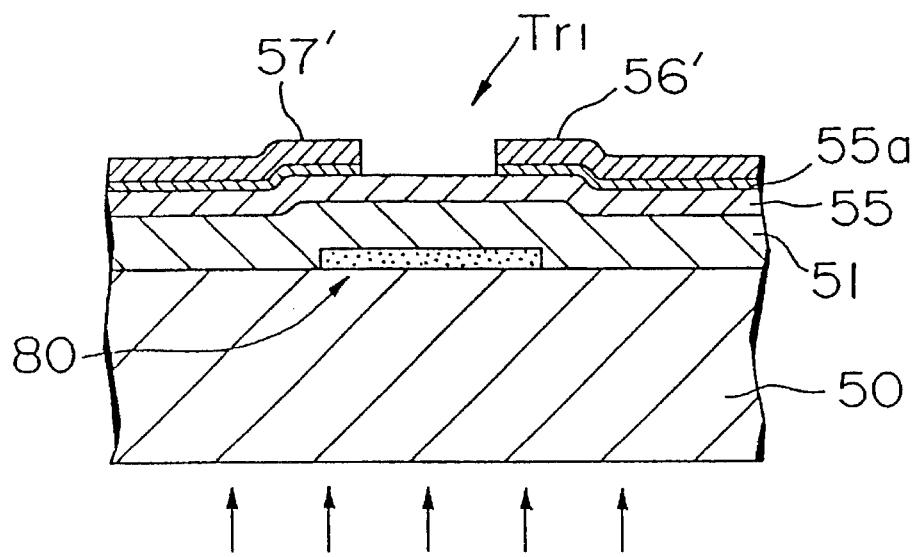
FIG. 8 is a structural view showing the first transistor used in the fifth embodiment.

In FIG. 8, the first transistor Tr1 has a gate electrode formed of a transparent conductive film such as an ITO on the substrate 50. The substrate 50 and the gate electrode 80 are covered with a gate insulating film 51. A semiconductor layer 55 is laminated on the gate insulating film 51. An ion doped semiconductor layer 55a is formed is formed on the semiconductor layer 55 and then is partially etched off. Finally, a channel etched type thin film transistor structure are formed as a switching element by forming the gate electrode 56' and the source electrode 57'.

Figure 9:
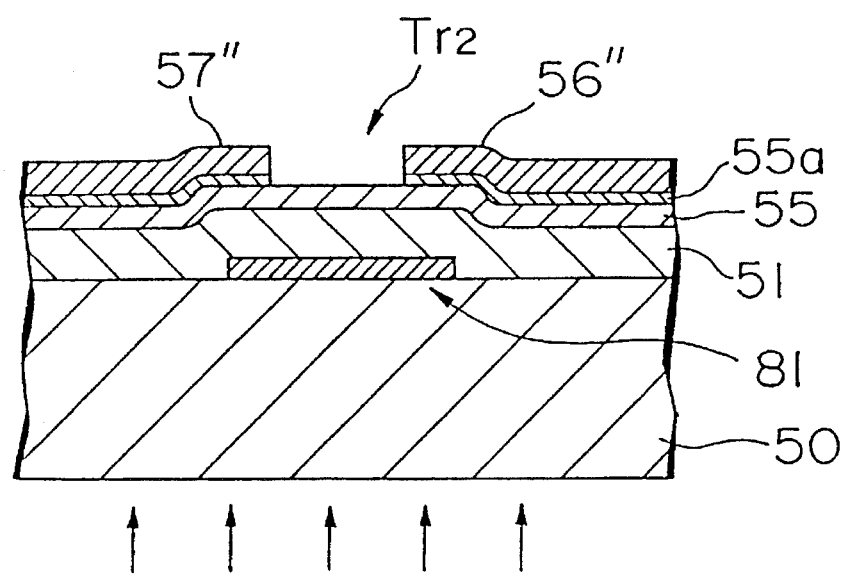
FIG. 9 is a structural view showing the second transistor used in the fifth embodiment.
Figure 10:
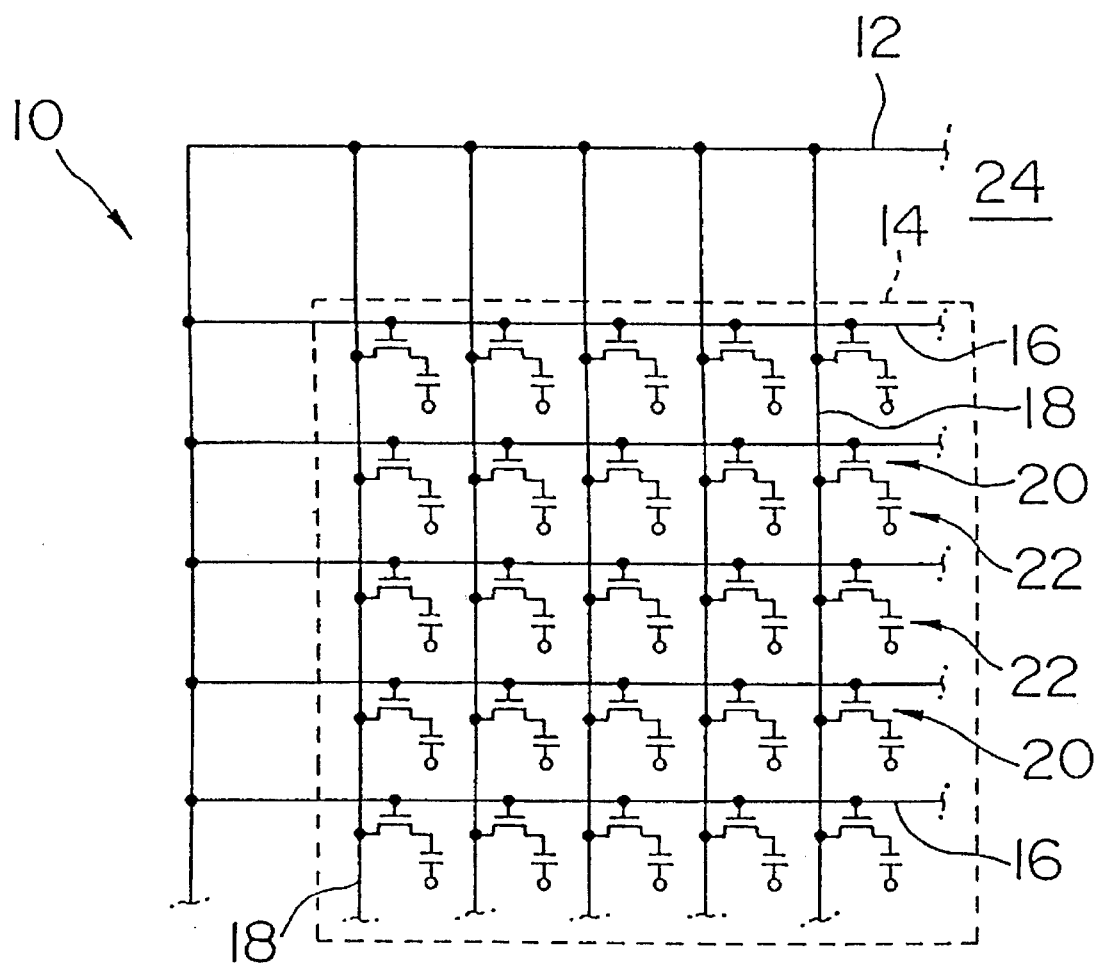
FIG. 10 is the circuit diagram of a conventional matrix wiring substrate.
Figure 11:
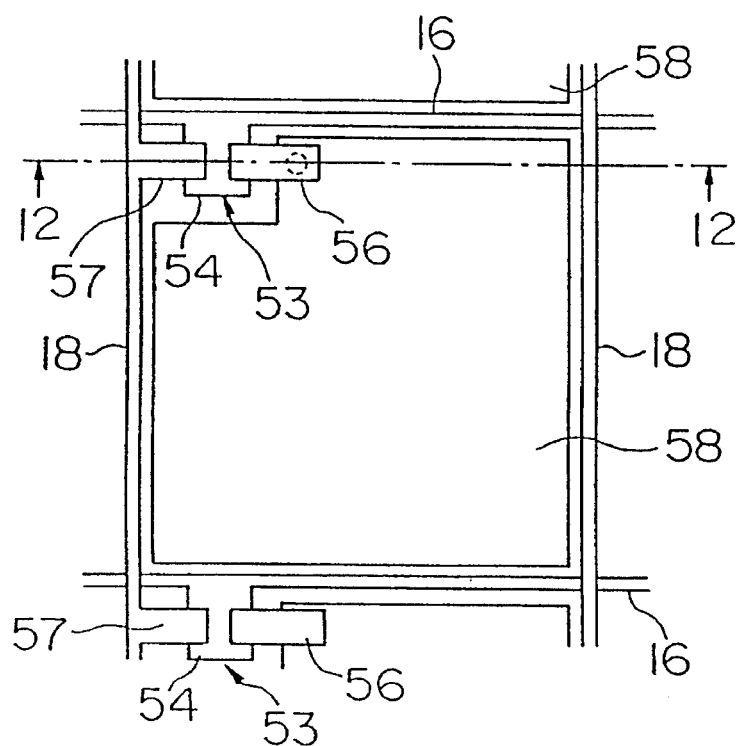
FIG. 11 a plan view showing a portion of an example of an active matrix liquid crystal display device structure.
Figure 12:
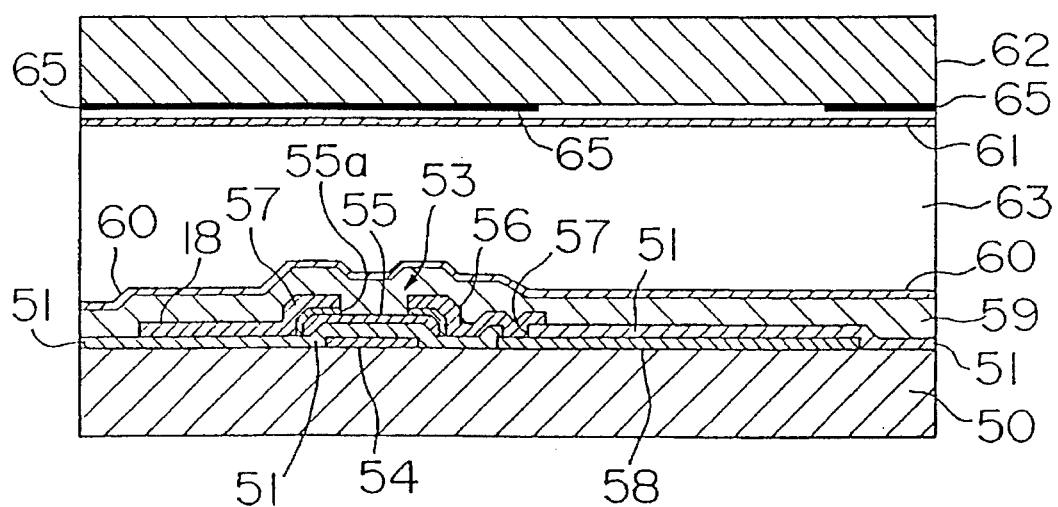
FIG. 12 is a cross sectional view of the active matrix liquid crystal display device taken along the line A-A shown in FIG. 11.

FIG. 9 shows an embodiment of a concrete structure of the second transistor Tr2. The second transistor Tr2 can be formed simultaneously by utilizing the liquid crystal substrate manufacturing process shown in FIG. 12.

The first transistor Tr1, as shown in FIG. 9, is formed as a switching element with a channel etch-type thin film transistor structure by forming a gate electrode 81 made of a light shielding conductive film such as a metal on the substrate 50; covering the substrate 50 and the gate electrode 81 with a gate insulating film 51; laminating the semiconductor layer 55 on the gate insulating film 51; forming an ion doped semiconductor layer 55a on the semiconductor layer 55; removing the semiconductor layer 55a partially; and forming a drain electrode 56" and a source electrode 57". In the similar manner to that of the first transistor Tr1 explained previously, the second transistor Tr2 in this embodiment can be formed by utilizing the step of forming the switching element 53.

When the switching element structure shown in FIGS. 8 and 9 are employed, it is required that a main transistor Tro is formed on the substrate 50. In this case, when the liquid crystal display is activated, the main transistor Tro is turned off. In order not to increase the load of the liquid crystal to the drive circuit, it is preferable to make the off-resistance $R_{offo}$ of the main transistor Tro as large as possible.

In order to realize such a condition, it must be prevented that backlight which illuminates onto the reference transistor Tro during a display period increases the off-resistance. For that reason, as shown in FIG. 9, it is desirable to construct the gate electrode with a light shielding conductive film, in the similar structure to the second transistor Tr2. Therefore, the main transistor Tro is formed by making in the similar manner to that in FIG. 9.

Furthermore, conventionally, the upper portion of the thin film transistor is covered on a light shielding film to prevent the upper portion of the liquid crystal display device from being illuminated by an incident light. In the case of the main transistor Tro, the light shielding film is applied to the above mentioned structure because it effects to increase the off-resistance $R_{offo}$ of the main transistor Tro.

(Embodiment 6)

Figure 13:
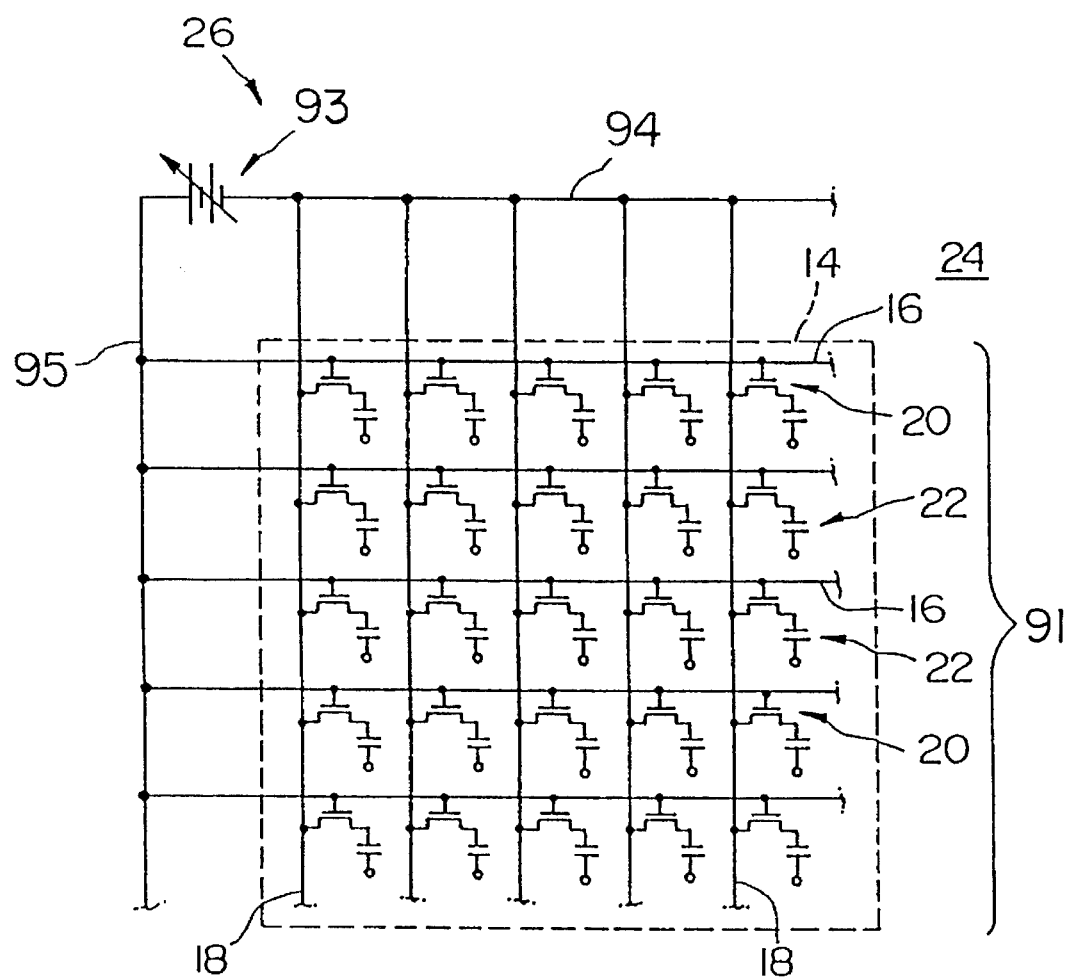
FIG. 13 is an equivalent circuit diagram of the matrix wiring substrate according to a sixth embodiment.

The matrix wiring substrate according to the sixth present embodiment is explained below with reference to FIG. 13. In the matrix wiring substrate 26 shown in FIG. 13, a first guard ring 94 and a second guard ring 95 are formed on the peripheral portion of a pixel area 14. The first guard ring 94 and the second guard ring 95 are formed of a conductive material. In the circuit wiring 91 in the pixel area 14, the source lines 18 are connected to the first guard ring 94 and the gate lines 16 are connected to the second guard ring 95. A power supply controller 93 is connected between the first guard ring 94 and the second guard ring 95. Any voltage generator which makes the switching element 20 to turn on may be used as the power supply controller 93. For example, a solar cell which generates electromotive force from light is applicable. Furthermore, in addition to the solar cell, various electromotive force generators including the power supply portion 28 shown in the first embodiment also can be applicable as the power supply controller 93.

When an electrostatic countermeasure is necessary, the switching element 20 can be turned on by supplying the electromotive force from the power supply controller 93 to the gate lines 16 and the source lines 18 or by supplying the electromotive force from a solar cell as the power supply controller 93 thereto. Therefore, even if static electricity occurs, the pixel electrodes are not electrically charged, whereby the switching elements 20 are not degraded due to the static electricity.

Particularly, in the matrix wiring substrate 26 including the power supply controller 93 according to the present embodiment, since a voltage is applied purposely to the switching elements 20, the on-resistance of the TFT switching element 20 is made to a small value so that the switching element 20 can be certainly turned on.

(Embodiment 7)

Figure 14:
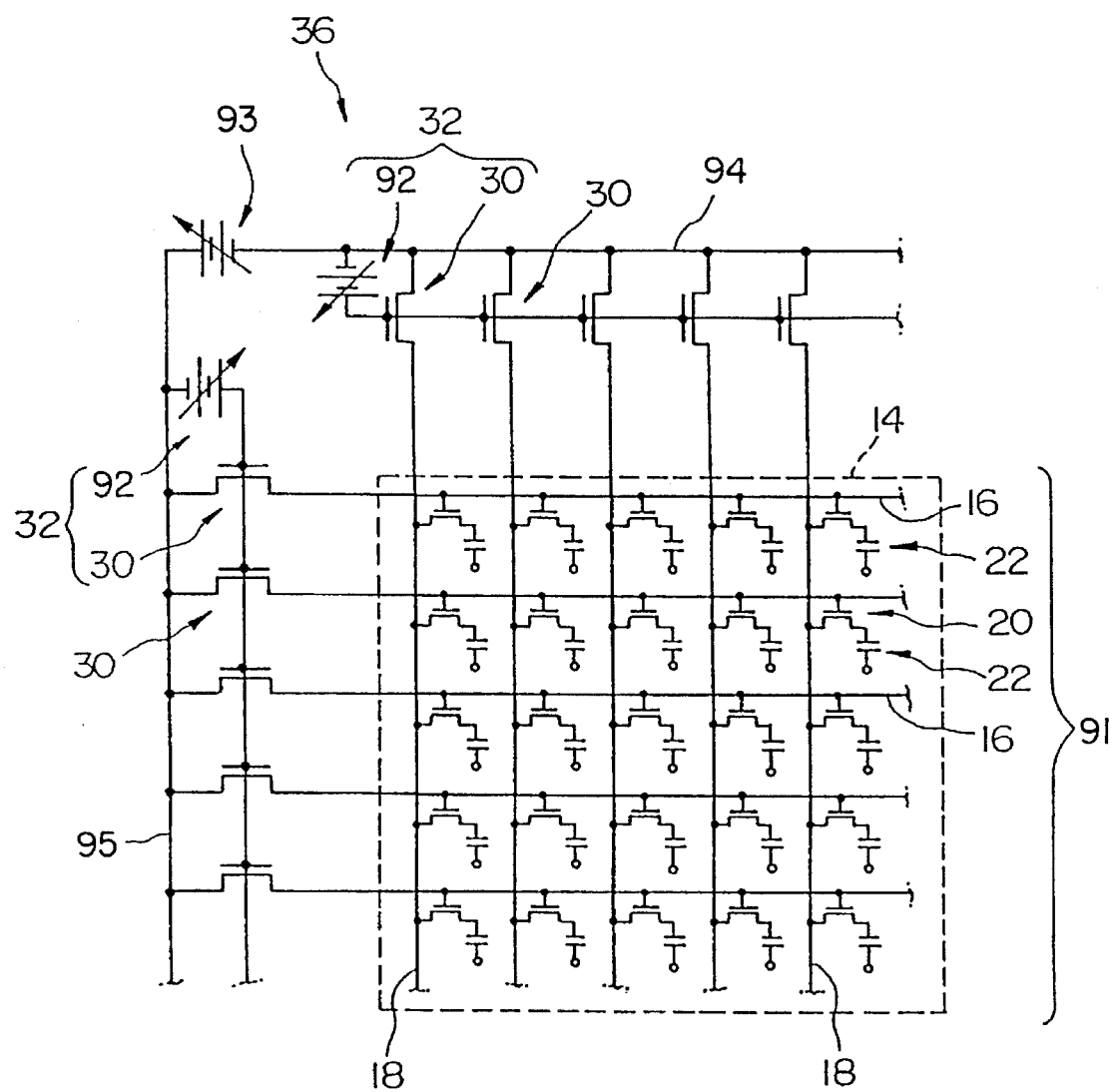
FIG. 14 is an equivalent circuit diagram of the matrix wiring substrate according to a seventh embodiment.

The matrix wiring substrate according to the seventh embodiment will be explained below with reference to FIG. 14. The matrix wiring substrate 36, as shown in FIG. 14, is difference from the matrix wiring substrate 26 of the sixth embodiment in that a separable portion 32 is formed between the circuit wiring 91 and the guard ring 94 while a separable portion 32 is formed between the circuit wiring 91 and the guard ring 95. The separable portion 32 is formed of a switching element 32 and a power supply element 92.

The switching element 30 has a function which can switch to the conduction or isolation between the circuit wiring 91 and the guard rings 94 and 95. In the matrix wiring substrate 36 shown in FIG. 14, the switching element 30 is formed of a TFT-type transistor.

The power supply element 92 controls the conduction/ isolation of the switching element 30. A solar cell is applied in the matrix wiring substrate 36 shown in FIG. 14. According to the present embodiment, the matrix wiring substrate which includes the functions and advantages obtained by the second and sixth embodiments is available.

Furthermore, it is possible to connect serially the gates of the switching elements 30, 30 made of a plurality of TFT transistors and to arrange a single power supply element between the gate electrodes and the guard ring 94. The single power supply element makes it easy to function it externally and certainly.

According to the matrix wiring substrate of the present invention, a circuit wiring, a guard ring connected to the circuit wiring, a separable portion for controlling the conduction or isolation between the circuit wiring and the the guard ring are formed over a substrate. During a manufacture, a conduction is established between the circuit wiring and the guard ring by controlling externally the separable portion.

Conducting between the circuit wiring and the guard ring prevents a potential difference therebetween produced due to static electricity because the lines in the circuit wiring are short-circuited electrically to the same potential. Therefore, no electrostatic discharge causes any breakage of the insulators and semiconductors of TFT transistors used for pixels and any damage of the circuit wiring due to heat from the electrostatic discharge, whereby the manufacturing yield of wiring substrates is increased remarkably.

When no electrostatic protection is needed after a connection of the drive circuits, the circuit wiring is isolated from the guard ring by controlling externally the separable portion. Isolating the circuit wiring from the guard ring enables that the circuit wiring is driven in response to a signal from the drive circuit.

Therefore, the matric wiring substrate according to the present invention does not require the cutting process of the guard ring from a circuit wiring. During the circuit wiring manufacturing process, the guard ring can be left in connected state until the drive circuit will be connected so that a protection against static electricity can be maintained until the drive circuit wanting an anti-static electricity is completely connected.

Furthermore, according to the present invention, no removal of the guard ring can prevent the damage due to static electricity which has very often occurred between a substrate and a cutting tool at the conventional cutting step, whereby manufacturing yield is increased remarkably comparing the conventional one.

Since the conduction/isolation between the guard ring and the circuit wiring can be repeated arbitrarily, the circuit wiring can be reconducted with the guard ring after a circuit wiring inspection. Hence the circuit wiring inspection can be performed at any time and at an early stage. Finding the malfunction of the circuit wiring at early time makes it possible to decrease largely the manufacturing loss.

During the manufacturing process, since the circuit wiring arranged in a matrix form is conducted one another, even if static electricity occurs, no potential difference causes electric discharge between lines, whereby the TFT transistors used for pixels, the insulators and the circuit wiring are not damaged. When the present invention is applied to active matrix-type liquid crystal display devices, the TFT transistors can be used as separable elements, whereby the structure according to the present invention can be employed without increasing the manufacturing steps. In addition, since the transparent-type liquid crystal display device can utilize a backlight as an external means, an electrostatic countermeasure can be taken without boosting the cost of the product. No parts rejected due to static electricity increase the manufacturing yield, thus leading to the lowered manufacturing cost.

In the circuit wiring substrate which has a guard ring formed in the peripheral portion thereof and a power supply controller for supplying an electromotive force to the guard ring, the switching element can be certainly turned on by applying a suitable voltage to the circuit wiring by means of the power supply controller. Thus even if the static electricity occurs, the pixel electrodes can be prevented from being electrically charged while the switching elements can be prevented from being degraded. This means that the present invention can provide sufficiently an electrostatic protection.

What is claimed is:

1. A matrix wiring substrate comprising:

a wiring matrix including a plurality of first parallel conductive lines and a plurality of second parallel conductive lines, said second parallel conductive lines being perpendicular to said first parallel conductive lines;

a separable portion formed along a periphery of said wiring matrix and connected to each of said first and second parallel conductive lines; and a guard ring formed along an outer periphery of said separable portion such that said separable portion is located between said guard ring and said wiring matrix;

wherein the separable portion includes:

a transistor having a first terminal connected to said guard ring, a second terminal connected to one of said first and second parallel conductive lines, and a gate; and a fixed resistor having a fixed resistance value and a variable resistor having a variable resistance value changeable in response to an external field, said fixed resistor and said variable resistor being connected in series between the guard ring and said one of said first and second parallel conductive lines, said fixed resistor and said variable resistor being connected in parallel with said transistor;

wherein a node located between said fixed resistor and said variable resistor is connected to the gate of said transistor.

2. A matrix wiring substrate according to claim 1 wherein the variable resistor comprises a material such that said variable resistance value is changeable in response to a change in one of light intensity, temperature, pressure and magnetic field.

3. A matrix wiring substrate according to claim 1, wherein the variable resistance value has a minimum value RL and a maximum value RH, the fixed resistor value is R0, and a relationship between the variable resistance value and the fixed resistance value is expressed by the equation:

$$0.7 \times RO \leq RL \leq 1.3 \times RO$$

$$RH \geq 10 \times RO$$

and wherein an on-resistance Ron and an off-resistance Roff of the transistor are expressed by the equation:

$$Ron \leq RL, RH \leq Roff.$$

4. A matrix wiring substrate according to claim 1 wherein the variable resistor is a thin film transistor having a gate electrode formed by a transparent conductive film.

5. A matrix wiring substrate according to claim 1 wherein the variable resistor is a thin film transistor having a gate electrode formed by a transparent conductive film, and the fixed resistor is a thin film transistor having a gate electrode formed by a light shielding conductive film.

6. A matrix wiring substrate comprising:

a wiring matrix including a plurality of first parallel conductive lines and a plurality of second parallel conductive lines, said second parallel conductive lines being perpendicular to said first parallel conductive lines;

a first plurality of transistors, each transistor of the first plurality of transistors having a gate connected to one of the first parallel conductive lines and a terminal connected to one of the second parallel conductive lines;

a separable portion formed along a periphery of said wiring matrix and connected to each of said first and second parallel conductive lines; and a guard ring formed along an outer periphery of said separable portion such that said separable portion is located between said guard ring and said wiring matrix;

wherein the separable portion includes:

a second plurality of transistors, each transistor of the second plurality of transistors having a first terminal connected to said guard ring, a second terminal connected to one of said first and second parallel conductive lines, and a gate; and a plurality of power supply elements, each power supply element having a first terminal connected to the guard ring and a second terminal connected to the gate of at least one of the second plurality of transistors.

7. The matrix wiring substrate according to claim 6, wherein each of the plurality of power supply elements is connected to a gate of an associated one of the second plurality of transistors.

8. The matrix wiring substrate according to claim 7 wherein each of said plurality of power supply elements includes:

a fixed resistor having a fixed resistance value and a variable resistor having a variable resistance value changeable in response to an external field, said fixed resistor and said variable resistor being connected in series between the guard ring and said one of said first and second parallel conductive lines, said fixed resistor and said variable resistor being connected in parallel with said associated one of said second plurality of transistors;

wherein a node located between said fixed resistor and said variable resistor is connected to the gate of said associated one of said second plurality of transistors.

9. The matrix wiring substrate according to claim 6 wherein said guard ring includes a first guard ring portion connected through said separable portion to said plurality of first parallel conductive lines, and a second guard ring portion connected through said separable portion to said plurality of second parallel conductive lines, and said matrix wiring substrate further comprises:

a power supply controller having a first terminal connected to the first guard ring portion and a second terminal connected to the second guard ring portion.

* * * * *